Nov. 21, 1950     T. P. N. BURNESS ET AL     2,530,421
APPLIANCE FOR USE IN CUTTING AND POLISHING
DIAMONDS AND OTHER SUBSTANCES
Filed July 30, 1947     3 Sheets-Sheet 1
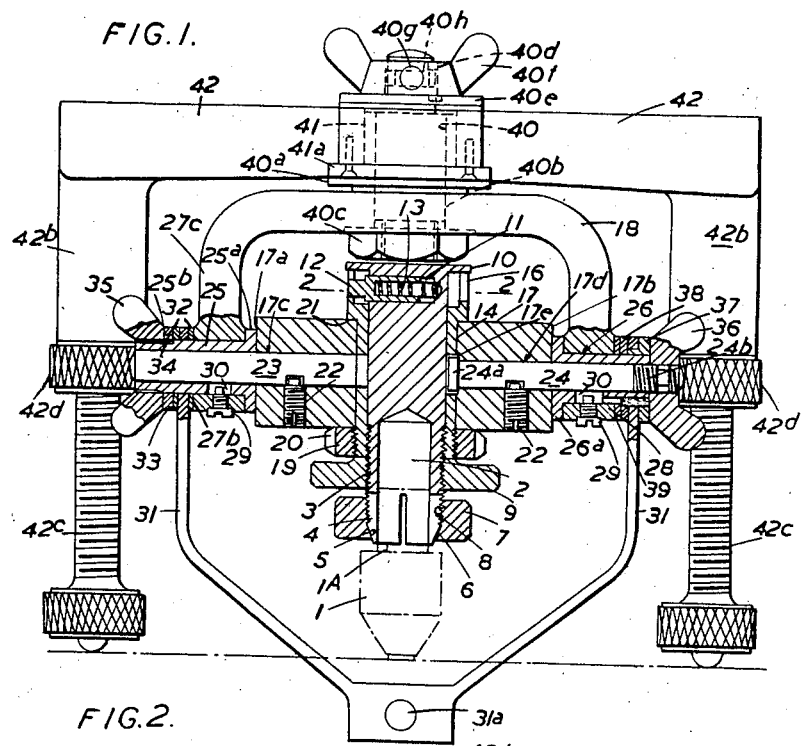
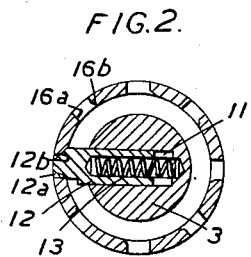
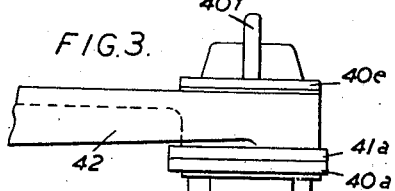
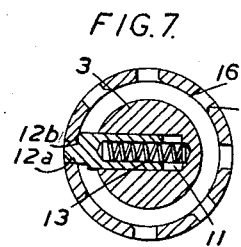
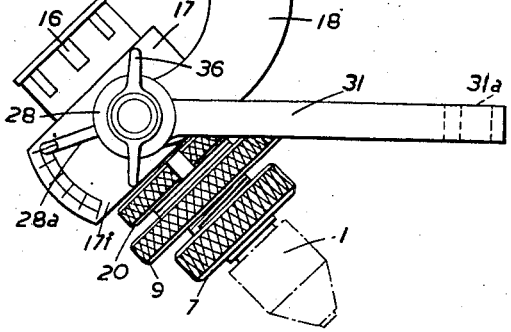
Inventors
Thomas P. N. Burness & Alfred Johnson
By Michael S. Striker
Agt Nov. 21, 1950  T. P. N. BURNESS ET AL  2,530,421
APPLIANCE FOR USE IN CUTTING AND POLISHING
DIAMONDS AND OTHER SUBSTANCES
Filed July 30, 1947  3 Sheets-Sheet 2
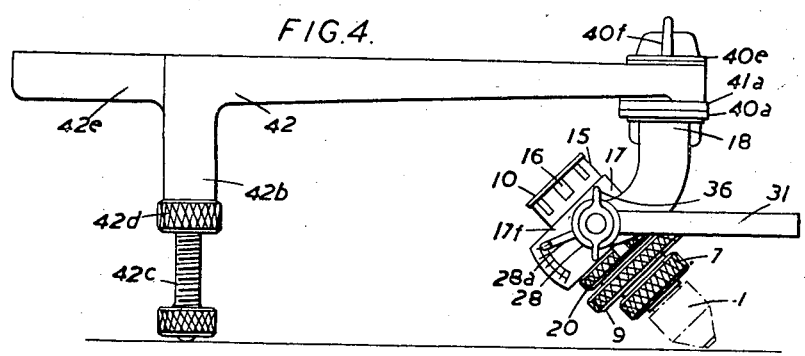
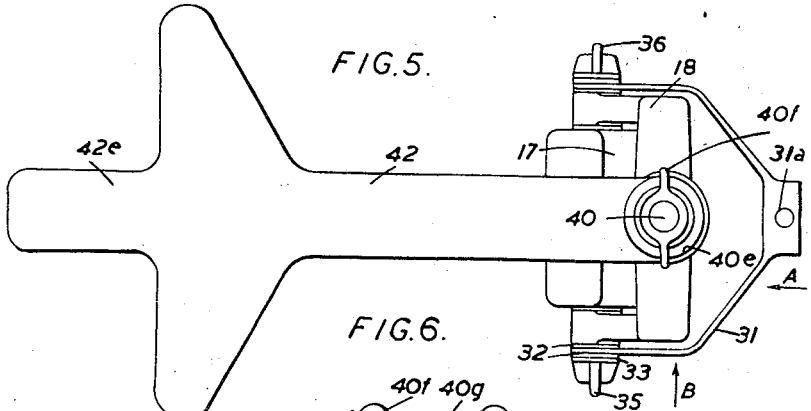
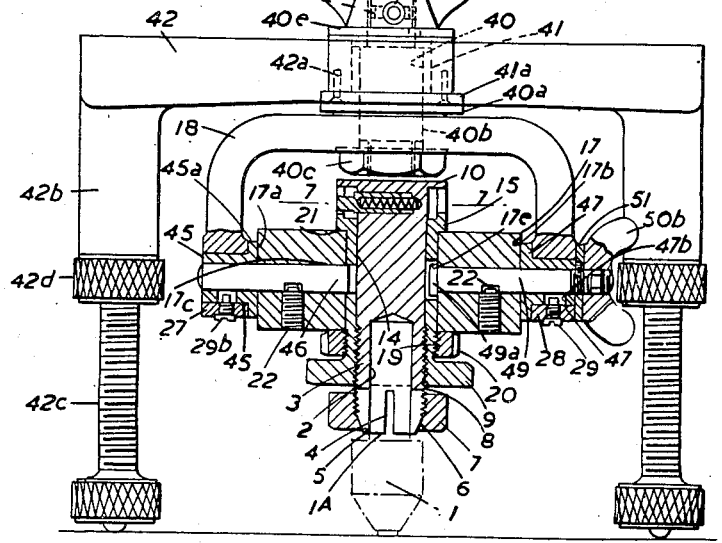

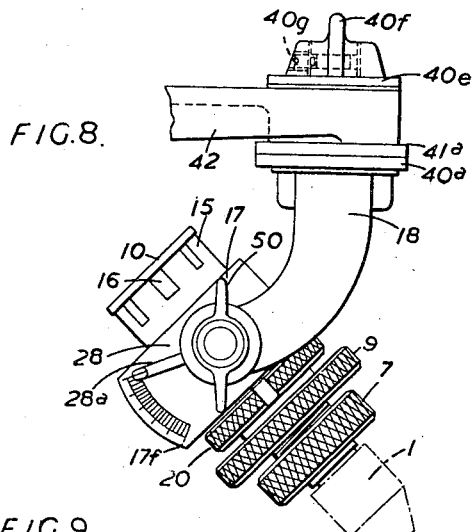
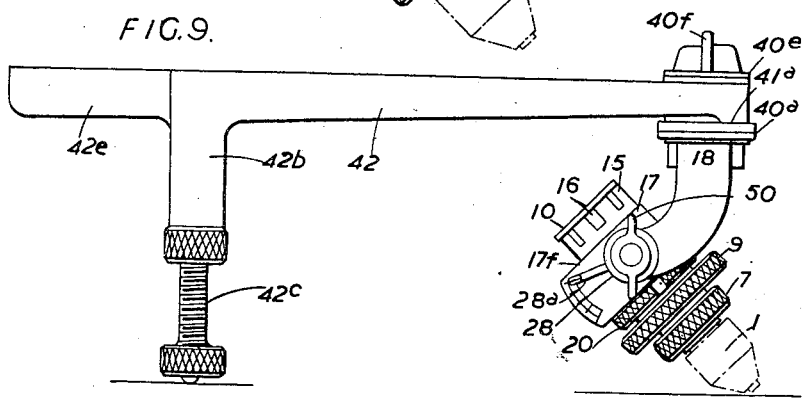
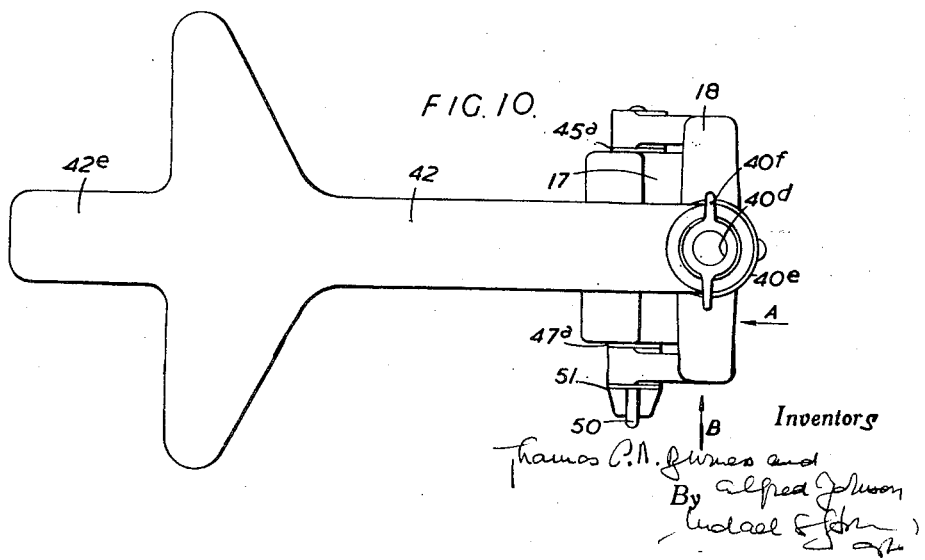

Patented Nov. 21, 1950

2,530,421

UNITED STATES PATENT OFFICE 2,530,421

APPLIANCE FOR USE IN CUTTING AND POLISHING DIAMONDS AND OTHER SUBSTANCES

Thomas P. N. Burness and Alfred Johnson,
Halifax, England

Application July 30, 1947, Serial No. 764,856
In Great Britain February 21, 1942

Section 1, Public Law 690, August 8, 1946
Patent expires February 21, 1962

2 Claims. (Cl. 51—229)

This invention relates to an appliance for use with a machine for cutting and polishing diamonds and other hard substances which are subjected to a like treatment by lapping and are hereinafter referred to as diamonds and to that type of appliance in which a dop of the cup or of the jaw type for holding the diamond to be ground is carried by a holder that is rotatably mounted in a support that is capable of various angular adjustments and also of being rotated about its own axis and provided with indexing mechanism, the various movements permitting the orientation of the grain of the diamond relatively to the lap, the presentation of the diamond at the correct inclination to the lap for cutting the various facets and the adjustment of the level of the diamond in relation to the lap.

The present invention has for its object to introduce a simplified and improved construction of appliance which will facilitate adjustments, provide improved locking arrangements for locking the parts in their adjusted positions and improve indexing with a view to obtaining greater accuracy and avoiding mistakes.

In the accompanying drawings:

Fig. 1 is an end view partly in section of the dop appliance looking in the direction of the arrow A in Fig. 5.

Fig. 2 is a section taken on line 2—2 of Fig. 1.

Fig. 3 is an elevation of part of the appliance looking in the direction of the arrow B in Fig. 5.

Fig. 4 is a side elevation of the complete appliance and

Fig. 5 is a plan of the appliance shown in Fig. 4.

Figs. 6 to 10 are similar to Figs. 1 to 5 showing a slightly modified construction.

Referring to the construction shown in Figs. 1 to 5, 1 indicates a dop in which the diamond to be ground is fixed. The dop 1 is formed with a spigot 1A to fit a socket 2 formed in a holder 3. The socket 2 is formed with a number of axial slits 4 and a conical end 5 to engage a conical surface 6 in a nut 7 by which the slit end of the dop holder can be contracted upon the dop spigot 1A. The dop holder 3 is threaded at 8 to receive the nut 7 and another nut 9 hereinafter referred to. The upper end of the dop holder 3 terminates in a head 10 and is formed below such head with a transverse passage or socket 11 in which a plunger 12 is slidably mounted and pressed in an outward direction by a spring 13. The dop holder 3 passes through a sleeve 14 that is formed at its upper end with a portion 15 of enlarged diameter in which are formed eight radial slots 16 and each radial slot is formed with an abutment surface 16a and an inclined surface 16b Fig. 2. The front end of the plunger 12 may be coloured and it is formed with an abutment surface or shoulder 12a Fig. 2 to abut against one side 16a of the slots 16 and form a positive index and with an inclined surface 12b to slide past the inclined surface 16b at the other side of the slots when the dop holder is turned from one indexing position to another. When the front end of the plunger is projected into any of the slots it may protrude therefrom to such an extent that it is plainly visible and if coloured is rendered still more noticeable. During its projection it makes a clicking sound which is plainly audible, and during its depression the increased resistance offered to the turning of the dop holder by the additional compression of the plunger spring is plainly felt. The sleeve 14 passes through a hole in a support 17 that is journalled in a fork 18 and provided with means for locking it in any angularly adjusted position. The lower end of the sleeve is threaded at 19 to receive a nut 20 which when tightened clamps the sleeve to the support 17 between a shoulder 21 on the sleeve and the nut 20. When the nut 9 on the dop holder is tightened it bears on the end of the sleeve and draws the head 10 of the dop holder against the top of the sleeve. It also turns the surface 12a into contact with the surface 16a and provides positive and accurate indexing. The support 17 is formed with two parallel faced surfaces 17a, 17b, with co-axial bores 17c, 17d, the bore 17c being larger than the bore 17d. Fixed in these bores by screws 22 are two journal pins 23, 24 the pin 23 being of larger diameter than the pin 24 for assembly purposes. These pins are free to turn in two sleeves 25, 26 that are mounted in bosses 27, 28 of the castor fork 18 and prevented from turning by screws 29 that enter slots 30 in the sleeves. The sleeve 25 is formed at its inner end with a flange 25a that occupies a position between the faced surface 17a on the support 17 and a faced surface on the boss 27. Free to turn on the sleeve 25 is one limb of a U-shaped member 31 and interposed between such limb and a faced surface 27b on the prong 27c is a friction ring 32 constructed of brake lining or other friction material. Interposed between the limb of the U-shaped member 31 and a ring 33 that is slidably keyed on the sleeve 25 by a pin 34 is another friction ring 32 and mounted on an external thread 25b on the sleeve 25 is a winged nut 35 which may be fitted with a retaining screw to enter an annular groove in the sleeve and enable the nut to be turned sufficiently in either direction for tightening and slackening purposes but prevent it from coming off the sleeve. When the nut 25 is slackened angular adjustment of the U-shaped member 31 can be effected or it can be moved from an inoperative position to an operative position or vice-versa. When the nut 35 is tightened, the limb of the U-shaped member 31 is gripped between the two friction washers 32 and the latter are gripped between the fork boss and the washer 33 very little turning effort on the nut 35 being sufficient to fix the U-shaped member 31 in the position to which it may have been turned. The other journal pin 24 is formed with a shoulder 24a that abuts against a counter bore 17e formed in the support. The end of the pin 24 is threaded at 24b to receive a winged nut 36 which may be attached in the manner described with reference to the winged nut 35. The inner face of the nut 36 bears against a flanged washer 37 that is keyed on a portion of the sleeve 26 that projects outside the boss of the fork 28 and acts as a support for the other limb of the U-shaped member 31. Mounted on the sleeve 26 adjacent to the washer 37 is another washer 38 which is also keyed to the sleeve and is followed by a friction washer 39 which bears against the fork boss. When the nut 36 is slackened the support 17 can be turned to any angular position in relation to the fork and be securely locked in the adjusted position by tightening the nut 36. When this nut is tightened the support 17 is clamped between the shoulder 24a on the journal pin 24 and the flange 26a on the sleeve 26. The fork boss 28 is also clamped between a flange 26a and the friction washer 39 by the washer 38 and the flanged washer 37 which latter contacts directly with the nut 36, the result being that very little turning effort need be expended on the nut 36 to fix the support 17 in the position to which it has been turned. This position is conveniently indicated by providing the support 17 with an extension 17f Figs. 3 and 4 which may be graduated in degrees and marked "facet angles" to read in conjunction with a pointer 28a on the castor fork boss 28. Alternatively means may be provided for positively arresting the turning movement of the support in any of its angular setting positions. A positive stop may also be provided for arresting the angular movement of the support when the dop is moved to a position at right angles to the lap for grinding the table of the diamond.

The U-shaped member 31 constitutes a tool holder for holding a tool in a socket 31a and such tool may be used for example for supporting and holding the diamond during the cutting operation, differently shaped tools being employed for different purposes. The tools can be adjusted in relation to the diamond by turning the U-shaped member about its axis and also by changing their position in the socket 31a.

The swivel pin for the fork 18 comprises a bolt 40 formed with a flange 40a. A portion 40b of the bolt passes through a hole in the crown of the fork and is fitted with a nut 40c between which and the flange 40a the crown of the fork is clamped. The bolt 40 passes through a sleeve 41 formed with a flange 41a that bears against the flange 40a and forms an accurate seat for the swivelling of the fork. The sleeve 41 passes through a hole in a supporting arm 42 and is fixed therein by screws 42a passing through the flange 41a. The bolt 40 is reduced in diameter at 40d and non-rotatably mounted thereon is a washer 40e that bears on a friction washer and is followed by a winged nut 40f provided with a screw 40g which enters an annular groove 40h in the bolt and enables the nut to be turned sufficiently in either direction for tightening and slackening purposes but prevents it from accidently coming off the bolt. This construction enables the fork to be turned about its axis and secured in any adjusted position by tightening the nut 40f only a slight effort being required to securely fix the castor in its adjusted position.

The arm 42 is provided intermediately of its length with two legs 42b either or both of which may be fitted with an adjusting screw 42c that is adapted to rest on the table of the machine and with a lock nut 42d for fixing the screw in its adjusted position. One side of the arm 42e behind the legs is adapted to bear against a pin fixed in the table of the machine and the other side of the arm in front of the legs is adapted to bear against another pin fixed in the table of the machine in accordance with the known practice.

By the construction described all that is necessary to index in order to grind successive facets on the diamond is firstly to slacken the nut 9 then turn the dop holder 2 to cause the spring actuated plunger 12 to be forced inwardly out of one indexing slot and outwardly by the spring 13 into the next succeeding slot. This operation can be seen, heard and felt. The nut 9 is then tightened against the end of the sleeve 14 to draw the head 10 of the dop holder down on to the top of the sleeve and lock the dop holder in position until it is again required to turn it for indexing purposes. This tightening of the nut automatically turns the dop holder very slightly and brings the surface 12a on the plunger into contact with the surface 16a and ensures positive and accurate indexing. This condition applies both for grinding the facets at the table end of the diamond or the facets at the collette end and the facets at either end can be ground first without any detriment to the finish of the product. It is only necessary to employ one type of dop which as previously stated may be of the cup type, or of the mechanical gripper type with the diamond mounted therein with the collette end, or the table end protruding and when using a dop of the cup type to insert a suitable type of holding tool into the U-shaped holder in order to give the diamond additional support. Any number of dops can be fitted with diamonds in either of the two positions described so that when one dop has been placed in the dop holder and the grinding operation has been performed, another dop is in readiness with its diamond for being treated in the same manner.

To position the grain of the diamond in relation to the lap in order to get the best cutting results, the wing nut 40f is slackened and the fork turned until the best cutting conditions are found. This may be repeated for each surface or facet. Adjustment of the diamond in relation to the lap is effected by the adjusting screws 42c.

The dop appliance shown in Figs. 6 to 10 is designed for use with a dop of the mechanical gripper type or for use where the U-shaped member or bridge piece 31 is not required.

In this construction the boss 27 of the fork 18 is fitted with a short sleeve 45 the outer end of which terminates at or in proximity to the outer face of the fork boss, the wing nut shown in Fig. 1 at this side of the appliance being dispensed with. The inner end of the sleeve 45 is formed with a flange 45ᵃ which occupies a position between a faced surface on the boss 27 and the faced surface 17ᵃ on the support 17 and the sleeve 45 is prevented from turning in the boss 27 by a screw 29 entering a slot 45ᵇ in the sleeve, this construction being the same as the one described with reference to Fig. 1. The journal pin 46 is made shorter than the journal pin 23 in Fig. 1 but is otherwise constructed and mounted in the same manner. The boss 28 of the fork is fitted with a short sleeve 47 which does not extend to the outer face of the boss 28. The inner end of the sleeve is formed with a flange 47ᵃ which occupies a position between a faced surface on the fork boss 28 and the faced surface 17ᵇ on the support 17 and the sleeve 47 is prevented from turning in the boss by a screw 29 entering a slot 47ᵇ in the sleeve, this construction being the same as that described with reference to Fig. 1. The journal pin 49 is formed with a shoulder 49ᵃ that abuts against a counter bore 17ᵉ formed in the support 17 and such pin is fixed in the support by a screw 22 in the manner described with reference to Fig. 1. The outer end of the unthreaded portion of the journal pin 49 terminates within the sleeve 47 and is threaded to receive a wing nut 50 the inner face of which bears against a washer 51 that is keyed on the portion of reduced diameter of the journal pin and occupies a position between the wing nut 50 and the outer face of the fork boss 28. A slight turning effort exerted upon the wing nut 50 clamps the support 17 between the shoulder 49ᵃ on the journal pin 49 and the flange 47ᵃ on the non-rotatable sleeve and also clamps the fork boss 28 between the flange 47ᵃ and the non-rotatable washer 51.

What we claim as our invention and desire to secure by Letters Patent of the United States is:

1. In a dop appliance for use in cutting and polishing diamonds and other gems, having a support; the combination of a sleeve mounted to be rotatably adjustable in said support; a shoulder spaced a predetermined distance from one end upon the sleeve for engagement upon one portion of the support and a threaded portion upon the other end of said sleeve; a manually operable nut mounted upon the threaded portion of the sleeve for engaging against another portion of said support to allow angular adjustment of said sleeve with respect to the latter and normally clamp against the support in order to fix the sleeve in attained position of adjustment, the sleeve having a plurality of radial indexing slots or apertures spaced apart in the one end thereof beyond the shoulder on the latter; a cylindrical member extending rotatably through said sleeve and having a transverse plunger socket extending radially a predetermined distance into the cylindrical member from one side adjacent to one end thereof at the level of the radial indexing slots of said sleeve; a plunger slidable in the plunger socket having the outer end thereof conditioned to fit in any one of said radial indexing slots; means for moving said plunger outward to engage in said radial indexing slots; a supported fork pivotally mounting said support; means for adjusting the latter with respect to the fork; an externally threaded gripping socket upon the other end of said cylindrical member for supporting a dop; a manually operated lock nut on the external thread upon the gripping socket operable to lock said cylindrical member in position with respect to said sleeve; and a further manually operated nut on said external thread on the gripping socket of said cylindrical member for adjusting said gripping socket in order to grip or release the dop at will.

2. In a dop appliance for use in cutting and polishing diamonds and other gems, having a support; the combination of a sleeve mounted to be rotatably adjustable in the support; a cup-like hollow enlargement formed upon one end of the sleeve and providing a shoulder upon the latter for engaging upon one portion of said support; a thread upon the other end of the sleeve; a manually operated nut upon the thread of said sleeve normally clamping against another portion of said support in order to fix said sleeve in attained position and releasable to allow angular adjustment of said sleeve with respect to said support, the cup-like enlargement having a plurality of radial indexing slots spaced apart in the wall thereof; a cylindrical member extending rotatably through the sleeve and having a transverse plunger socket extending a predetermined distance into the cylindrical member from one side adjacent to one end thereof; a plunger slidable in the plunger socket in said cylindrical member and having the outer end thereof narrower than the main body of the plunger to fit into any one of the radial indexing slots in said sleeve; a spring in said socket biasing said plunger outward to engage in said radial indexing slots; a shoulder forming a stop on said plunger for stopping outward movement of the plunger under pressure of said spring when the narrower outer end of said plunger extends through one of said slots to the exterior of said sleeve into visible and accessible position on said dop appliance in various angular positions of said cylindrical member in said support; a split gripping socket upon the other end of said cylindrical member for supporting the dop; an external thread on said split gripping socket; a manually operated lock nut on the external thread on the split gripping socket for manually locking said cylindrical member with respect to said sleeve; and a further manually operated nut mounted on the last mentioned external thread for adjusting said split gripping socket in order to grip or release the dop at will.

T. P. N. BURNESS.
ALFRED JOHNSON.

REFERENCES CITED

The following references are of record in the file of this patent:

UNITED STATES PATENTS

| Number | Name | Date |
|---|---|---|
| 569,252 | Strasburger | Oct. 13, 1896 |
| 740,902 | Oostendorp | Oct. 6, 1903 |
| 852,948 | Gehris | May 7, 1907 |
| 925,016 | McMullen | June 15, 1909 |
| 1,106,745 | Stevens | Aug. 11, 1914 |
| 1,143,252 | Conradson | June 15, 1915 |
| 1,259,603 | Conrad | Mar. 19, 1918 |
| 1,958,021 | Schmidt | May 8, 1934 |
| 2,276,789 | Nagy | Mar. 17, 1942 |
| 2,383,619 | Rosner | Aug. 28, 1945 |